US012731920B2

(12) United States Patent
Cheng et al.

(10) Patent No.: US 12,731,920 B2
(45) Date of Patent: Sep. 8, 2026

(54) TERMINAL STRIP STRUCTURE, CONNECTOR DEVICE AND ITS CONDUCTIVE TERMINAL

(71) Applicant: Jentech Precision Industrial Co., LTD., Taoyuan City (TW)

(72) Inventors: Shan-Yong Cheng, Taoyuan City (TW); Chang-Chi Yeh, Taoyuan City (TW); Chung-Yuan Hsu, Taoyuan City (TW)

(73) Assignee: Jentech Precision Industrial Co., LTD., Taoyuan City (TW)

( * ) Notice: Subject to any disclaimer, the term of this patent is extended or adjusted under 35 U.S.C. 154(b) by 379 days.

(21) Appl. No.: 18/617,636

(22) Filed: Mar. 26, 2024

(65) Prior Publication Data

US 2025/0047018 A1 Feb. 6, 2025

Related U.S. Application Data

(60) Provisional application No. 63/517,112, filed on Aug. 1, 2023.

(30) Foreign Application Priority Data

Feb. 6, 2024 (TW) ................................ 113104824

(51) Int. Cl.
*H01R 13/24* (2006.01)
*H01R 9/16* (2006.01)
(Continued)

(52) U.S. Cl.
CPC ............ *H01R 9/2608* (2013.01); *H01R 9/16* (2013.01); *H01R 9/2491* (2013.01)

(58) Field of Classification Search
CPC ...... H01R 9/2608; H01R 9/16; H01R 9/2491; H01R 13/2442; H01R 12/57; H01R 13/02;
(Continued)

(56) References Cited

U.S. PATENT DOCUMENTS 6,851,986 B2 * 2/2005 Zhao ................. H01R 13/2435 439/744
8,277,256 B2 * 10/2012 Ju ...................... H01R 13/6588 439/626
(Continued)

FOREIGN PATENT DOCUMENTS

CN 201054411 Y 4/2008
CN 102683937 A 9/2012
(Continued)

*Primary Examiner* — Abdullah A Riyami
(74) *Attorney, Agent, or Firm* — CKC & Partners Co., LLC

(57) ABSTRACT

A conductive terminal is suitable for being installed in a terminal receiving slot of a base, and includes a main body, an elastic arm portion and a foot connecting portion. The main body includes a holding portion and a buckle portion. The elastic arm portion includes a reversed folded portion, an abutment portion, a bending portion and a conductive portion. The reversed folded portion extends downward from a lower surface of the main body and extends upward after being folded. The abutment portion is opposite to the main body, and located between the reversed folded portion and the bending portion. The bending portion is connected to the abutment portion and the conductive portion. The foot connecting portion is connected to the main body or the reversed folded portion, and provided with a ball soldering member for connecting to soldering balls.

20 Claims, 12 Drawing Sheets

(51) Int. Cl.
*H01R 9/24* (2006.01)
*H01R 9/26* (2006.01)

(58) Field of Classification Search
CPC ... H01R 13/2414; H01R 13/428; H01R 43/16
See application file for complete search history.

(56) References Cited

U.S. PATENT DOCUMENTS

| | | | | |
|---|---|---|---|---|
| 2003/0096518 | A1* | 5/2003 | Tsai | H05K 7/1038 439/81 |
| 2010/0003869 | A1 | 1/2010 | Kimura et al. | |
| 2010/0297866 | A1* | 11/2010 | Ju | H01R 13/2485 439/342 |
| 2012/0028502 | A1* | 2/2012 | Yeh | H01R 12/57 439/626 |
| 2012/0156939 | A1* | 6/2012 | Ju | H01R 12/89 439/660 |
| 2018/0331442 | A1* | 11/2018 | Huang | H01R 12/585 |
| 2019/0181579 | A1* | 6/2019 | Ju | H01R 13/502 |
| 2019/0199029 | A1* | 6/2019 | Ju | H01R 12/58 |
| 2019/0280415 | A1* | 9/2019 | Huang | H01R 13/502 |
| 2020/0169024 | A1* | 5/2020 | Ou | H01R 13/2442 |
| 2020/0227855 | A1* | 7/2020 | Ho | H01R 13/2457 |

FOREIGN PATENT DOCUMENTS

| | | | |
|---|---|---|---|
| CN | 103138127 | A | 6/2013 |
| CN | 105529552 | A | 4/2016 |
| TW | 201123625 | A | 7/2011 |

* cited by examiner

TERMINAL STRIP STRUCTURE, CONNECTOR DEVICE AND ITS CONDUCTIVE TERMINAL

RELATED APPLICATION

This application claims priority to U.S. Provisional Application Ser. No. 63/517,112, filed on Aug. 1, 2023, and Taiwan Application Serial Number 113104824, filed Feb. 6, 2024, the disclosures of which are incorporated herein by reference in their entireties.

BACKGROUND

Field of Disclosure

The present disclosure relates to a terminal strip structure, a connector device and a conductive terminal of the connector device.

Description of Related Art

In general, a connector device is a connecting device that is electrically connected to wires, circuit boards and other circuit components. A structure of the connector device includes a base and a plurality of conductive terminals received within the base together.

However, since each of the conductive terminals will be inserted into a terminal receiving slot of the base through hard interferences, the internal stress of the conductive terminal temporarily deformed may cause uncontrollable warping within the terminal receiving slot so as to cause the conductive terminal to be failingly assembled in the high-temperature environment during the surface mount assembly (SMT) process, thereby affecting the overall conductive performance of the connector device.

Therefore, the above-mentioned technologies obviously still have inconveniences and defects, which are issues that the industry needs to solve urgently.

SUMMARY

One aspect of the present disclosure is to provide a terminal strip structure, a connector device and a conductive terminal for solving the difficulties mentioned above in the prior art.

In one embodiment of the present disclosure, a conductive terminal is formed by bending an elastic metal sheet and suitable for being installed in a terminal receiving slot of a base, and the conductive terminal includes a main body, an elastic arm portion and a foot connecting portion. The main body includes at least one holding portion and a buckle portion, and the holding portion and the buckle portion are respectively used for fixing the main body within the terminal receiving slot. The elastic arm portion includes a reversed folded portion, an abutment portion, a bending portion and a conductive portion. The reversed folded portion extends downward from a lower surface of the main body and extends upward after being folded. The abutment portion is located between the reversed folded portion and the bending portion, and arranged opposite to the main body. The bending portion is connected to the abutment portion and the conductive portion, respectively. The foot connecting portion is connected to one of the main body and the reversed folded portion, and further provided with a ball soldering member extending outwardly from the foot connecting portion for connecting to soldering balls.

In one embodiment of the present disclosure, a connector device includes a base and a plurality of conductive terminals. The base is formed with a plurality of terminal receiving slots. Each of the terminal receiving slots includes a slot body, an engaging portion and a limiting slot, and the engaging portion and the limiting slot are commonly disposed on one inner surface of the slot body. Each of the conductive terminals includes a main body, an elastic arm portion and a foot connecting portion. The main body is disposed within the slot body and includes at least one holding portion limiting the main body within the limiting slot, and a buckle portion engaged with the engaging portion. The elastic arm portion includes a reversed folded portion, an abutment portion, a bending portion and a conductive portion. The reversed folded portion extends downward from a lower surface of the main body and extends upward after being folded. The abutment portion is located between the reversed folded portion and the bending portion, arranged opposite to the main body, and physically contacted with another inner surface of the slot body. The bending portion protrudes obliquely from the terminal receiving slot, and is connected to the abutment portion and the conductive portion, respectively. The foot connecting portion protrudes downwardly from one of the main body and the reversed folded portion to extend out of the terminal receiving slot. The foot connecting portion is further provided with a ball soldering member extending outwardly from the foot connecting portion for connecting to soldering balls.

In one embodiment of the present disclosure, a terminal strip structure includes a material strip and a plurality of conductive terminals. The material strip includes a plate portion and a plurality of extension portions. The plate portion and the extension portions are coplanar with each other. The extension portions are arranged on a lateral side of the plate portion at intervals. Each of the extension portions protrudes outwards from the plate portion, one end of each of the extension portions facing away from the plate portion is provided with a neck portion, and a thickness of the neck portion is smaller than a thickness of one of the extension portions. Each of the conductive terminals includes a main body, an elastic arm portion and a foot connecting portion. An upper surface of the main body is connected to the neck portion, and the main body includes at least one holding portion and a buckle portion, and the elastic arm portion includes a reversed folded portion, an abutment portion, a bending portion and a conductive portion. The reversed folded portion extends downward from a lower surface of the main body and extends upward after being folded. The abutment portion is located between the reversed folded portion and the bending portion, and arranged opposite to the main body. The bending portion is connected to the abutment portion and the conductive portion, respectively. The foot connecting portion is connected to one of the main body and the reversed folded portion, and the foot connecting portion is further provided with a ball soldering member extending outwardly. After the conductive terminals of the terminal strip structure respectively are inserted into a plurality of terminal receiving slots of a base, the material strip is completely separated from the conductive terminals by repeatedly swinging the material strip frontwards and backwards to break the neck portions.

Thus, through the construction of the embodiments above, the conductive terminal of the disclosure can be assembled into the terminal receiving slot of the base without hard interference, thereby reducing the possibility of the conductive terminal being uncontrollable warped in the base so as to lower the overall conductive performance of the connector device.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
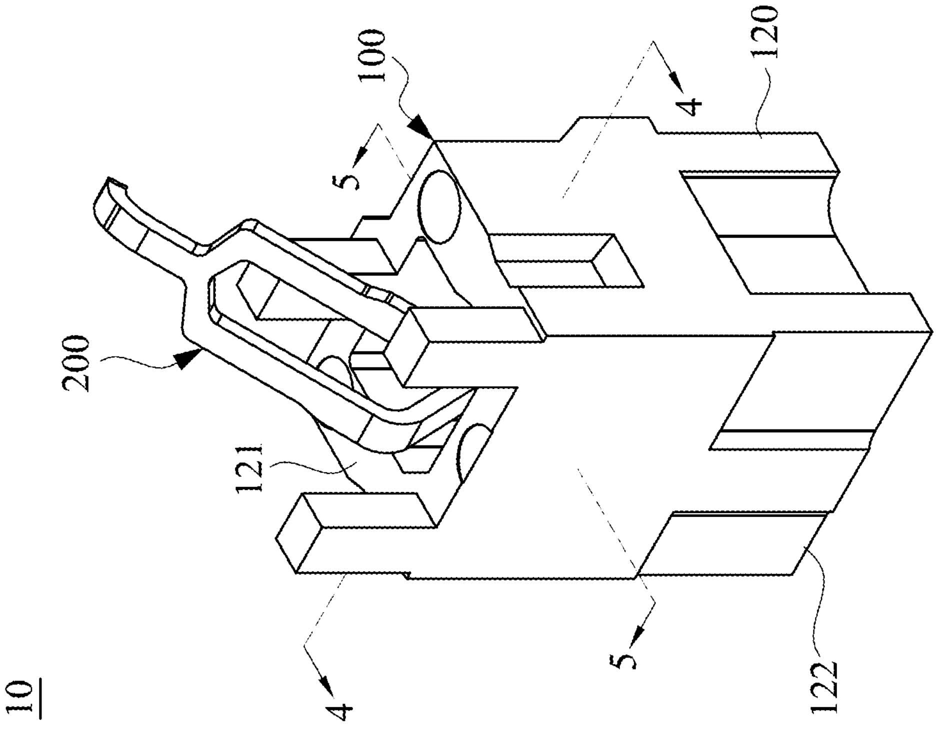
FIG. 1 is a perspective view of a connector device according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

Figure 3:
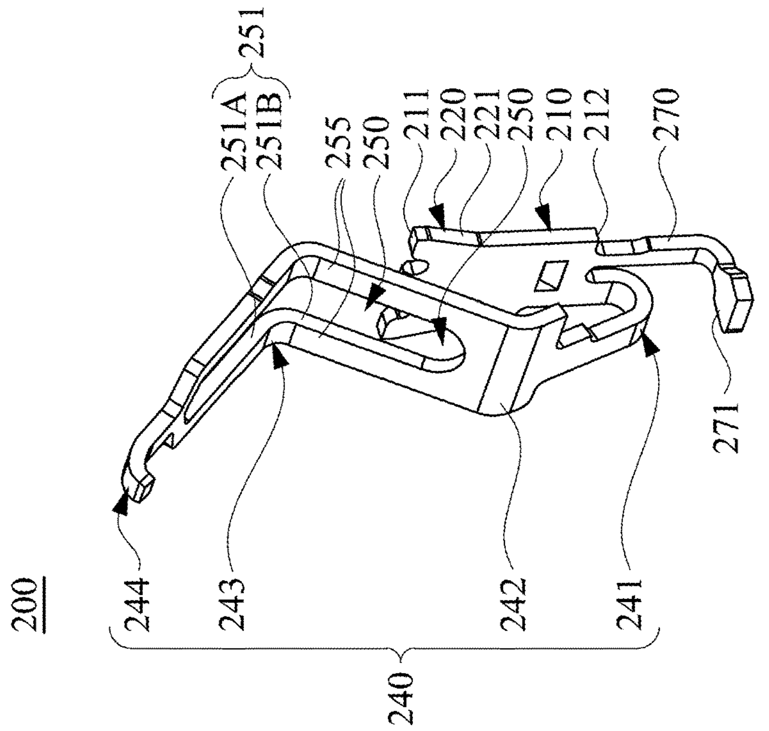
FIG. 3 is a perspective view of a conductive terminal viewed from another aspect in FIG. 2.
Figure 2:
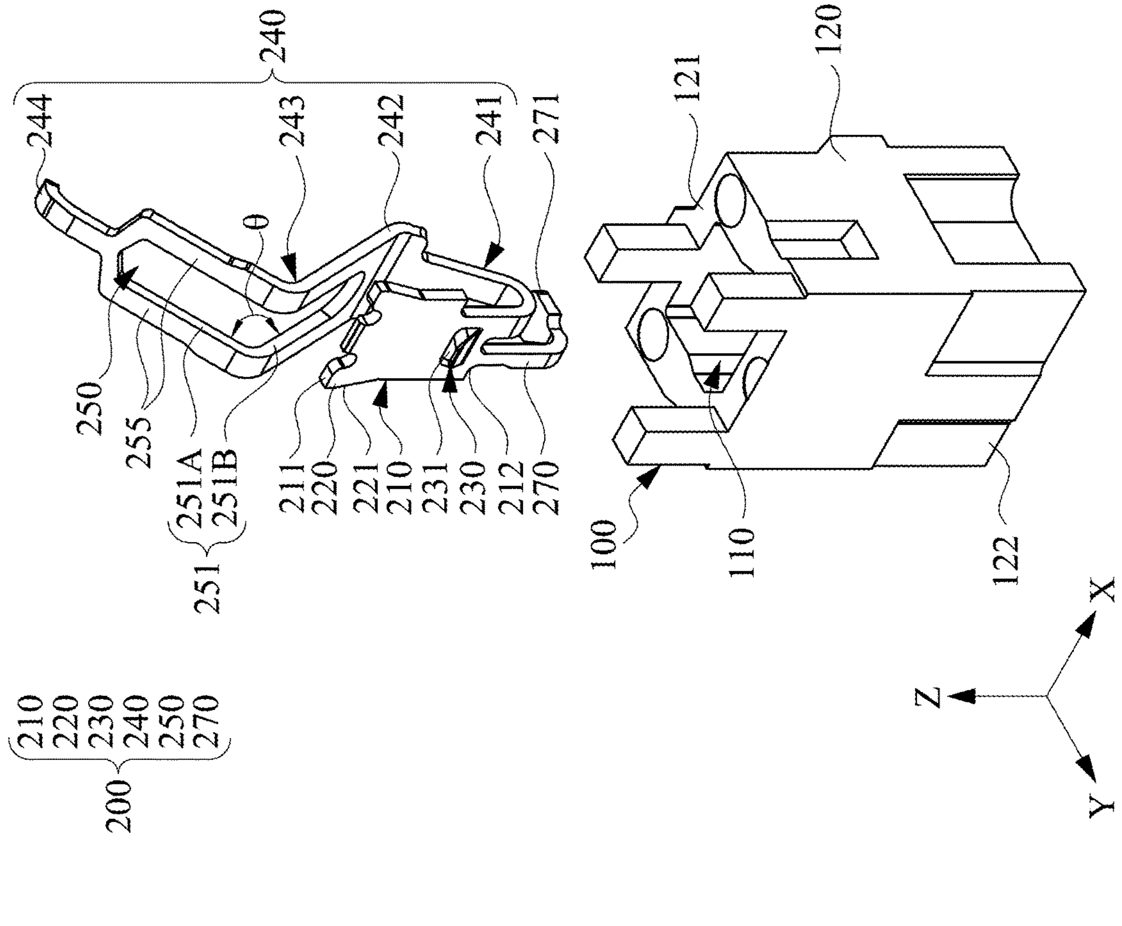
FIG. 2 is a disassembly view of the connector device of FIG. 1.
Figure 5:
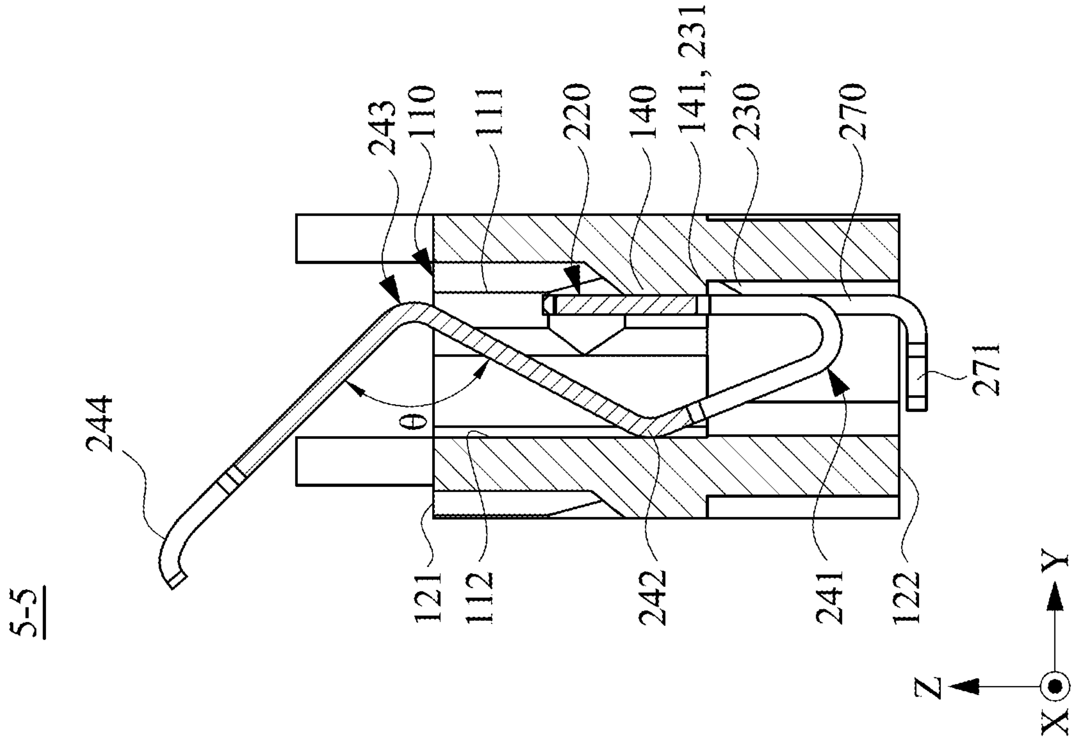
FIG. 5 is a cross-sectional view of the connector device viewed along a line 5-5 of FIG. 1.
Figure 4:
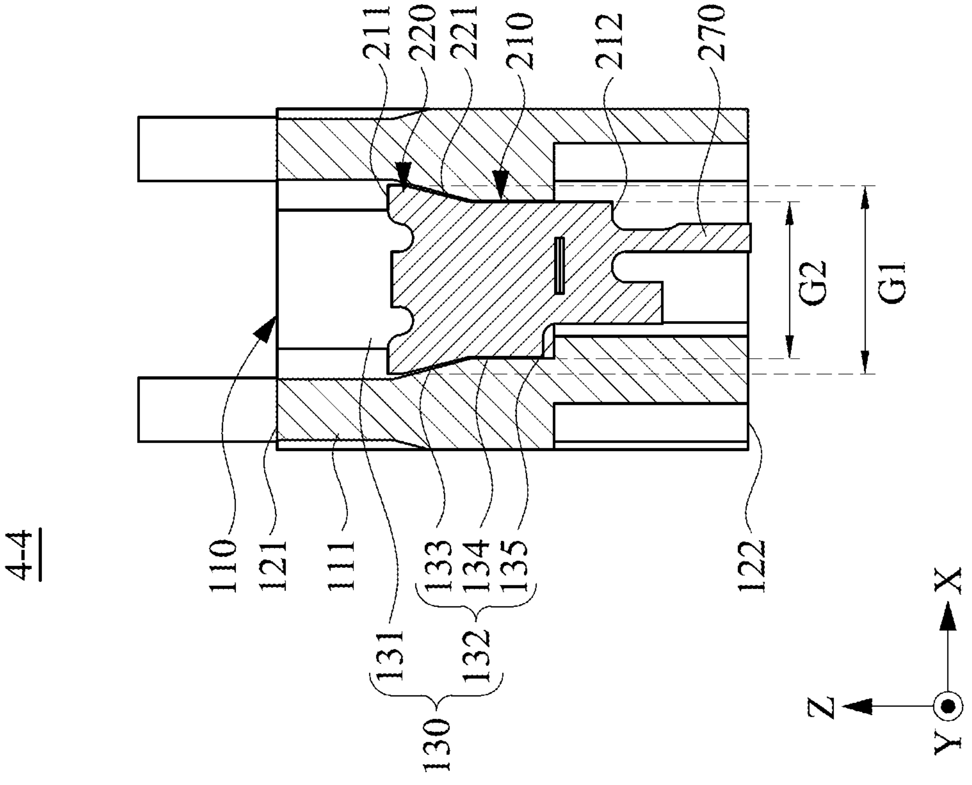
FIG. 4 is a cross-sectional view of the connector device viewed along a line 4-4 of FIG. 1.

Reference is now made to FIG. 1 to FIG. 5, in which FIG. 1 is a perspective view of a connector device 10 according to one embodiment of the present disclosure, FIG. 2 is a disassembly view of the connector device 10 of FIG. 1, FIG. 3 is a perspective view of a conductive terminal 200 viewed from another aspect in FIG. 2, FIG. 4 is a cross-sectional view of the connector device 10 viewed along a line 4-4 of FIG. 1, and FIG. 5 is a cross-sectional view of the connector device 10 viewed along a line 5-5 of FIG. 1. In this embodiment, as shown in FIG. 1 to FIG. 3, a connector device 10 includes a base 100 and a conductive terminal 200. The base 100 is provided with a base body 120 having a top surface 121 and a bottom surface 122 which are opposite to each other, and the base body 120 is formed with at least one terminal receiving slot 110. The terminal receiving slot 110 passes through the base body 120 in a long axis direction of the base body 120 (i.e., Z axis) to be connected to the top surface 121 and the bottom surface 122 of the base body 120, respectively. The terminal receiving slot 110 includes a slot body, a limiting slot 130 (FIG. 4) and an engaging portion 140 (FIG. 5). The slot body (refer to the terminal receiving slot 110) is a substantial main body of the terminal receiving slot 110, and the slot body is provided with a first inner surface 111 and a second inner surface 112 which are opposite to each other (FIG. 5). The first inner surface 111 and the second inner surfaces 112 are arranged in sequence in the Y axis, and each of the first inner surface 111 and the second inner surfaces 112 is connected to the top surface 121 and the bottom surface 122 of the base body 120, respectively. The engaging portion 140 and the limiting slot 130 are respectively disposed within the slot body of the terminal receiving slot 110. For example, the limiting slot 130 is formed on the first inner surface 111 (FIG. 4), and the engaging portion 140 is formed inside the limiting slot 130 (FIG. 5).

As shown in FIG. 1 to FIG. 3, the conductive terminal 200 is formed by bending an elastic metal sheet and installed within the slot body of the terminal receiving slot 110 of the base 100. The conductive terminal 200 integrally includes a main body 210, an elastic arm portion 240 and a foot connecting portion 270. The main body 210 is shaped as a sheet, and provided with an upper surface 211 and a lower surface 212 which are opposite with each other. The main body 210 includes one or more (e.g., two) holding portions 220 and a buckle portion 230. These holding portions 220 are respectively located on two opposite sides of the main body 210 and connected to the upper surface 211 of the main body 210. After the conductive terminal 200 is inserted into the slot body of the terminal receiving slot 110 of the base 100, and the main body 210 is moved downwardly into the limiting slot 130, by two opposite inner surfaces of the limiting slot 130 respectively abutting against the holding portions 220, the main body 210 can be position-limited within the limiting slot 130 by these holding portions 220, and the buckle portion 230 and the engaging portion 140 are buckled with each other, so that the main body 210 is fixed within the slot body of the terminal receiving slot 110 (FIG. 4 and FIG. 5). The elastic arm portion 240 includes a reversed folded portion 241, an abutment portion 242, a bending portion 243 and a conductive portion 244. The reversed folded portion 241 is connected to the lower surface 212 of the main body 210, extends downward from the lower surface 212 of the main body 210 and then is redirected to extend upward after being folded. The abutment portion 242 is located between the reversed folded portion 241 and the bending portion 243, arranged opposite to the main body 210, and physically contacted with or decently press the second inner surface 112 of the slot body of the terminal receiving slot 110, that is, the abutment portion 242 is the outermost protruding point of the elastic arm portion 240 (between the reversed folded portion 241 and the bending portion 243) facing away from the main body 210. The bending portion 243 is V-shaped, and one part thereof protrudes obliquely from the terminal receiving slot 110, and arranged between the abutment portion and the conductive portion, and connected to the abutment portion and the conductive portion, respectively. The conductive portion 244 is located at one free end of the elastic arm portion 240 opposite to the main body 210 so as to be subsequently contacted with the contact point of the electronic component (not shown in figures). The foot connecting portion 270 and the reversed folded portion 241 are commonly connected to the same surface of the main body 210 (e.g., the lower surface 212), the foot connecting portion 270 and the reversed folded portion 241 both extend downward from the lower surface 212 of the main body 210 to extend outwardly from the terminal receiving slot 110 so as to be subsequently soldered on the contact point of the electronic component (not shown in figures).

In the embodiment, specifically, the reversed folded portion 241 is gradually extended downward to the bottom surface 122 of the base body 120 from the lower surface 212 of the main body 210, and redirected to extend gradually upward to the top surface 121 of the base body 120 and the second inner surfaces 112 of the slot body of the terminal receiving slot 110 after being folded.

After the abutment portion 242 is contacted with the second inner surfaces 112, a part of the bending portion 243 gradually extends toward the top surface 121 of the base body 120 and the first inner surface 111 of the slot body of the terminal receiving slot 110 (FIG. 5), and the other part of the bending portion 243 obliquely extends out of the terminal receiving slot 110 from the reversed folded portion 241 in a direction away from the main body 210 (or extends to the top surface 121 of the base body 120). The foot connecting portion 270 is in an L shape, which means that the foot connecting portion 270 is further provided with a ball soldering member 271 extending outwardly from the foot connecting portion 270 away from the main body 210. The foot connecting portion 270 is used to connect soldering balls, and the foot connecting portion 270 is further connected to the contact points of the circuit board (not shown in figures) through the soldering balls. However, the disclosure is not limited to this.

As shown in FIG. 4, more specifically, the limiting slot 130 is funnel-shaped, and the limiting slot 130 is provided with a slot bottom 131 and two inner walls 132. The inner walls 132 are opposite to each other, and the slot bottom 131 is located between the inner walls 132 and adjacent to the inner walls 132. Each of the inner walls 132 includes an inclined surface 133 and a flat surface 134. The flat surface 134 is connected to the inclined surface 133 and closer to the bottom surface 122 of the base body 120 than the inclined surface 133.

In addition, one of the inner walls 132 is further provided with a bottom wall 135. The flat surface 134 is connected to the inclined surface 133 and the bottom wall 135, and the bottom wall 135 is closer to the bottom surface 122 of the base body 120 than the flat surface 134. The inclined surfaces 133 of these inner walls 132 are respectively extended downward (e.g., toward the bottom surface 122 of the base body 120) and are gradually approached to each other, thereby gradually shortening the distance between the inclined surfaces 133.

Therefore, as shown in FIG. 4, when the main body 210 moves downward into the limiting slot 130, the main body 210 and the holding portions 220 are respectively contacted with the slot bottom 131 and the inner walls 132, so that the inclined surfaces 133, the flat surfaces 134 and the bottom walls 135 collectively fix the main body 210 within the limiting slot 130.

Furthermore, one side of each of the holding portions 220 facing away from the main body 210 is provided with a limiting slope 221, the limiting slopes 221 are arranged opposite to each other, and respectively extended downward (e.g., extended towards the bottom surface 122 of the base body 120) to gradually approach each other, thereby gradually shortening the distance between the limiting slopes 221.

Therefore, since a distance G1 between these inclined surfaces 133 is greater than a distance G2 between these flat surfaces 134, when the main body 210 is located within the limiting slot 130, the limiting slopes 221 of the main body 210 respectively contact the inclined surfaces 133 of the limiting slot 130 so that the main body 210 can be held within the limiting slot 130 for preventing from moving downward.

Furthermore, as shown in FIG. 5, the buckle portion 230 and the engaging portion 140 are substantially wedge-shaped. The buckle portion 230 is protruded from one side of the main body 210 facing away from the elastic arm portion 240, and the buckle portion 230 is provided with an upper abutment surface 231 facing upwardly. The engaging portion 140 is protruded on the slot bottom 131 of the slot body, and located on the middle of the slot body of the terminal receiving slot 110. The engaging portion 140 is provided with a lower abutment surface 141 facing downwardly. Therefore, when the main body 210 moves down to a certain extent in the limiting slot 130 until the upper abutment surface 231 of the buckle portion 230 and the lower abutment surface 141 of the engaging portion 140 are abutted to against to each other, the main body 210 is fixed within the limiting slot 130, so that the main body 210 cannot protrudes out of the limiting slot 130 upwardly.

As shown in FIG. 2 and FIG. 5, in the embodiment, the bending portion 243 has a bending angle θ, so that the conductive portion 244 is staggered from the terminal receiving slot 110 in the vertical direction (e.g., Z axis), that is, an orthographic projection of the conductive portion 244 along the vertical direction is not located within the terminal receiving slot 110. In this embodiment, the bending angle θ is between 90° and 110°. However, the disclosure is not limited thereto.

In addition, since the bending portion 243 has a specific bending angle θ, the elastic arm portion 240 can reduce the force of the abutment portion 242 pressing against the second inner surface 112, thereby preventing the conductive terminal 200 from being inserted into the terminal receiving slot 110 of the base 100 through hard interference.

In this embodiment, as shown in FIG. 2, the elastic arm portion 240 is further formed with an elongated hole 250 having a closed outline, and the elongated hole 250 is formed on the bending portion 243 and longitudinally extended along the long axis trajectory of the elastic arm portion 240 so as to divide the bending portion 243 into two first support arms 255. These first support arms 255 are spaced arranged along the X-axis direction abreast. However, the present disclosure is not limited thereto. The inner surface 251 of the elongated hole 250 has a first section 251A and a second section 251B connected to each other. The first section 251A and the second section 251B are intersected each other. In other words, one end of the elongated hole 250 starts from one position of the bending portion 243 adjacent to the conductive portion 244, then two separated current paths (i.e., first support arms 255) are formed, and the other end of the elongated hole 250 ends on one position of the bending portion 243 adjacent to the abutment portion 242.

Figure 6:
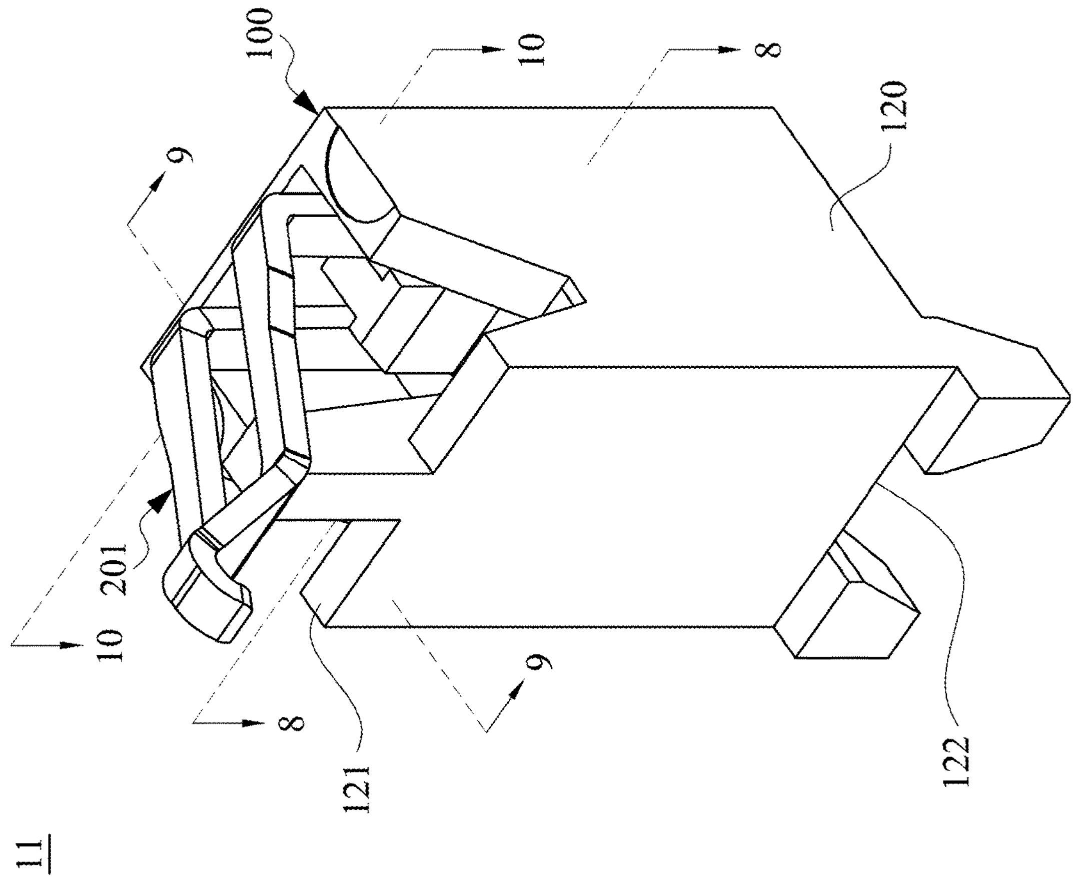
FIG. 6 is a perspective view of a connector device according to one embodiment of the present disclosure.
Figure 7:
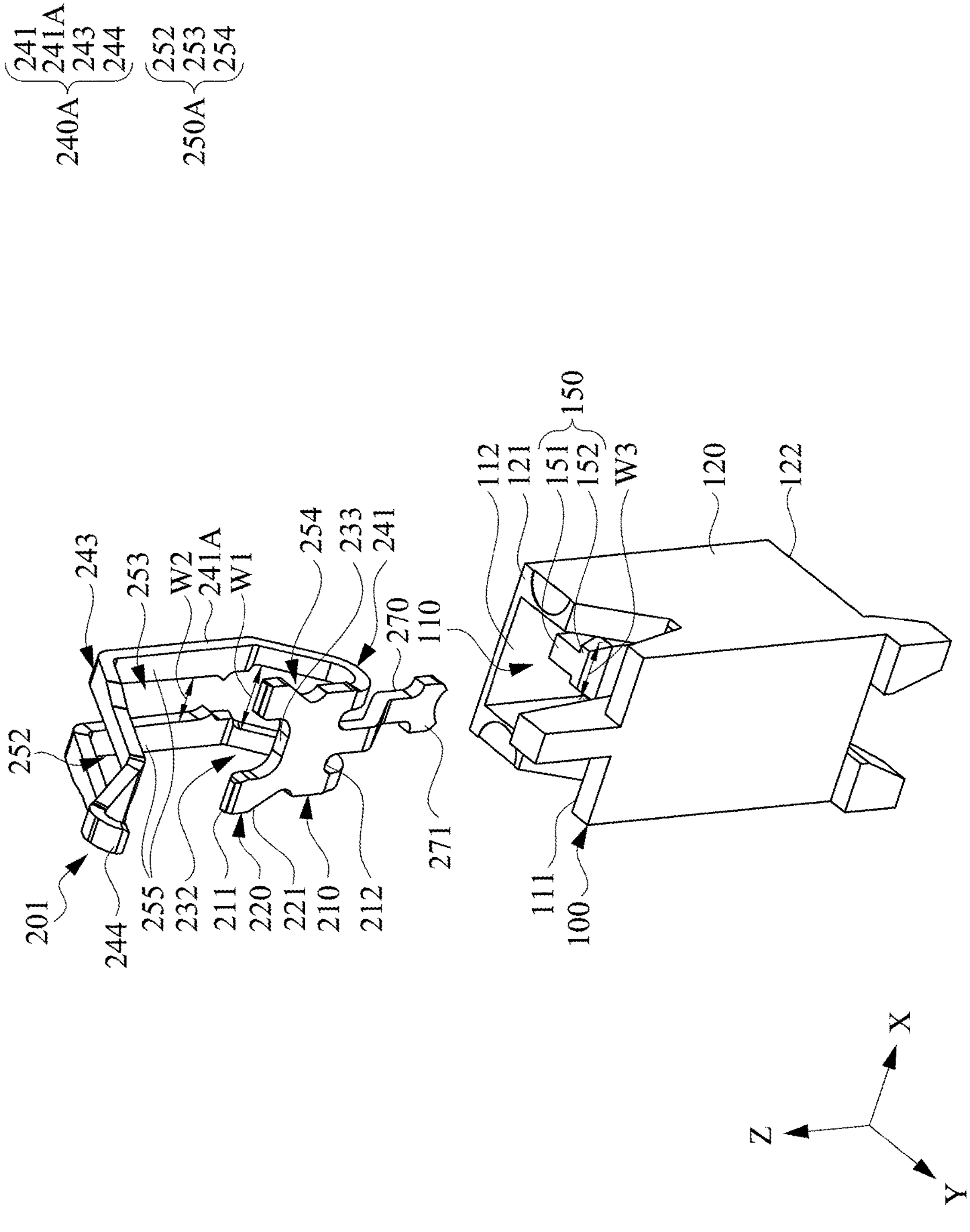
FIG. 7 is a disassembly view of the connector device of FIG. 6.
Figure 8:
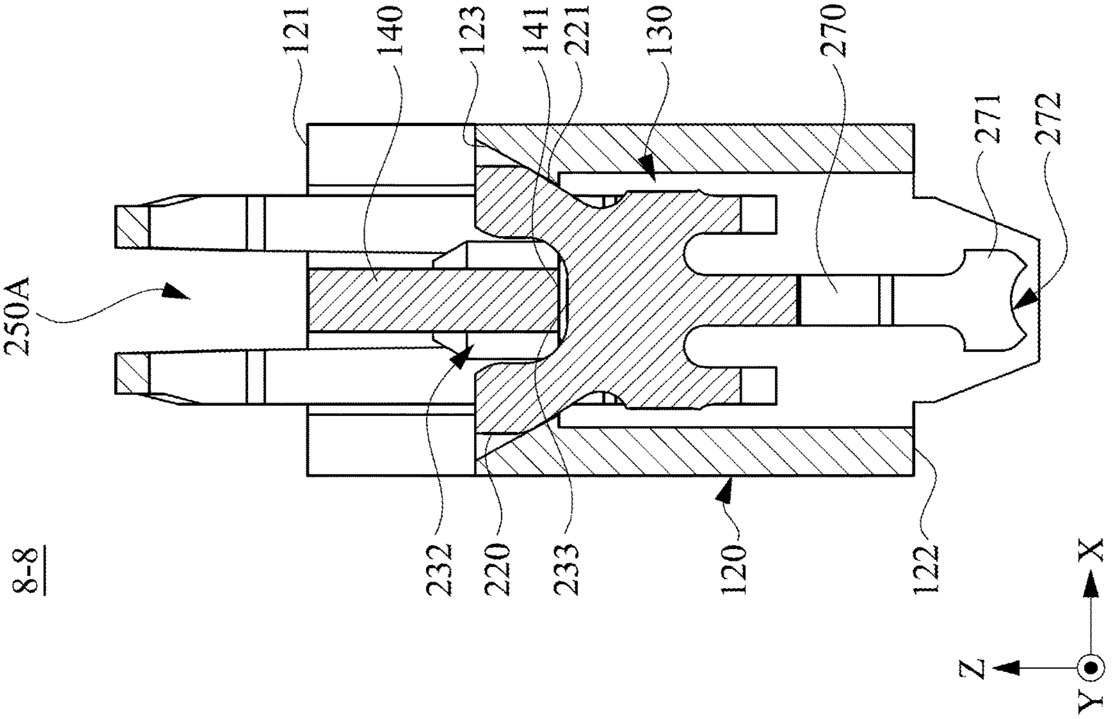
FIG. 8 is a cross-sectional view of the connector device viewed along a line 8-8 of FIG. 6.

FIG. 6 is a perspective view of a connector device 11 according to one embodiment of the present disclosure. FIG. 7 is a disassembly view of the connector device 11 of FIG. 6. FIG. 8 is a cross-sectional view of the connector device

Figure 9:
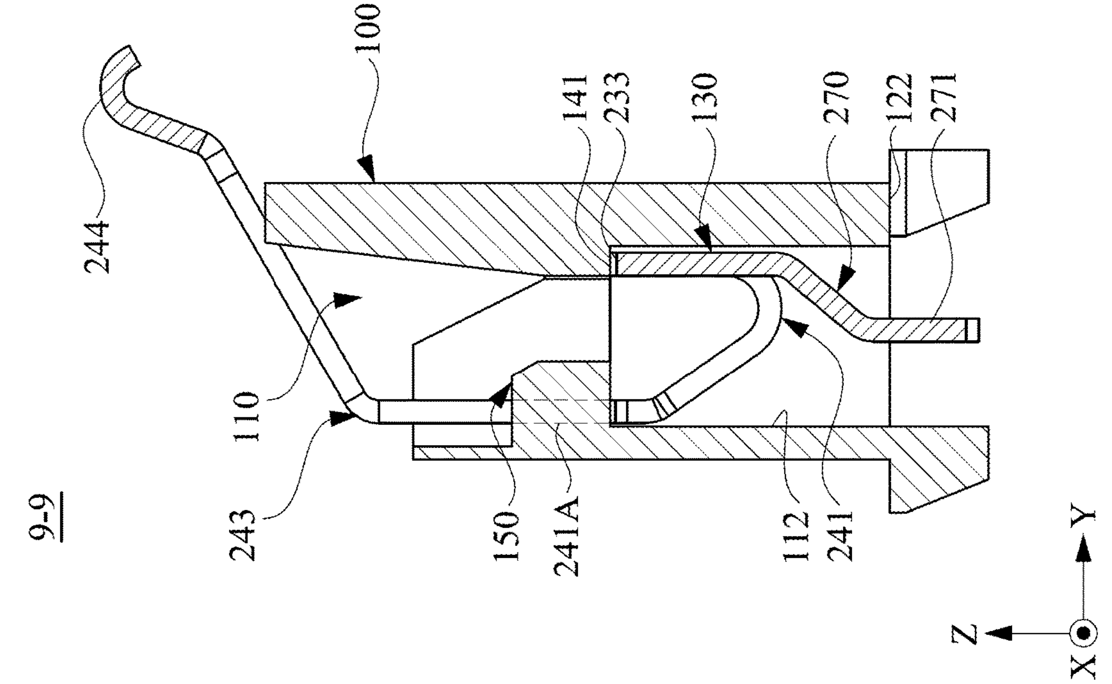
FIG. 9 is a cross-sectional view of the connector device viewed along a line 9-9 of FIG. 6.
Figure 10:
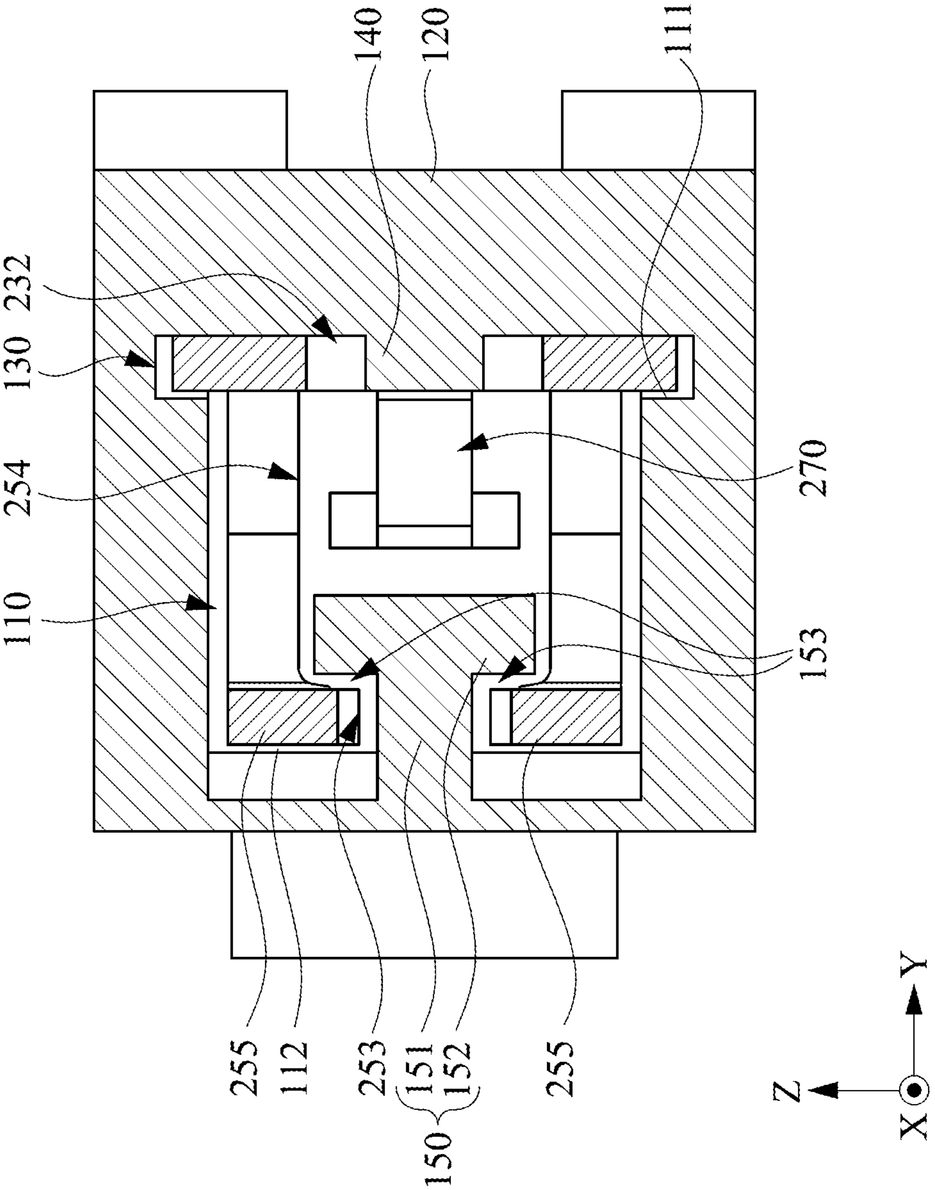
FIG. 10 is a cross-sectional view of the connector device viewed along a line 10-10 of FIG. 6.

11 viewed along a line 8-8 of FIG. 6. FIG. 9 is a cross-sectional view of the connector device 11 viewed along a line 9-9 of FIG. 6. FIG. 10 is a cross-sectional view of the connector device 11 viewed along a line 10-10 of FIG. 6.

As shown in FIG. 6 to FIG. 10, the connector device 11 of the embodiment and the connector device 10 of the embodiment are the substantially the same, however the differences therebetween are listed below. An upper surface of the main body 210 of the conductive terminal 201 is formed with a concave portion 232, and the concave portion 232 has an inner bottom surface 233. Thus, when the main body 210 is position-limited within the limiting slot 130, by abutting the lower abutment surface 141 of the engaging portion 140 and the buckling portion (e.g., the inner bottom surface 233 of the concave portion 232) against each other, the main body 210 is fixed within the limiting slot 130, so that the main body 210 cannot move upward for removing from the limiting slot 130.

The elongated hole 250A of the elastic arm portion 240 is collectively located on the bending portion 243, the abutment portion 241A and the reversed folded portion 241, and the elongated hole 250A continuously extends to the lower surface 212 of the main body 210, so that the first support arms 255 defined by the elongated hole 250A are respectively connected to the lower surface 212 of the main body 210. The foot connecting portion 270 located between the first support arms 255 extends downwardly from the lower surface 212 of the main body 210 (i.e., the inner surface 251 of the elongated hole 250A) to extend out of the elongated hole 250A and the terminal receiving slot 110.

Different from the abutment portion 242 of the above embodiment which is the outermost protruding point, in this embodiment, the abutment portion 241A is a flat plane of the first support arms 255 facing away from the main body 210. In this embodiment, the reversed folded portion 241 which is folded is extended obliquely to reach upward the second inner surfaces 112 of the slot body of the terminal receiving slot 110, the abutment portion 241A (refer to the first support arm 255) begins to extend linearly to the bending portion 243 along the second inner surfaces 112 of the slot body of the terminal receiving slot 110. The bending portion 243 obliquely extends out of the terminal receiving slot 110 according to a direction from the abutment portion 241A toward the main body 210. Thus, in the embedment, the abutment portion 241A does not contact or at least surface contact with the second inner surface 112 of the slot body of the terminal receiving slot 110, so as to lower the possibilities of damage or indentation to the terminal receiving slot 110 of the base body 120.

In addition, the elongated hole 250A includes a first section 252, a second section 253 and a third section 254 which are connected in sequence. The first section 252 is disposed on the bending portion 243, the second section 253 is disposed on the abutment portion 241A, and the third section 254 is disposed on the reversed folded portion 241, and the third section 254 is connected to the second section 253 and the lower surface 212 of the main body 210. A width W1 of the third section 254 is greater than a width W2 of the second section 253. The base 100 further includes a guide frame 150. The guide frame 150 includes a protruding rib 151 and a stopping plate 152. The protruding rib 151 is located within the second section 253 and connected to the second inner surface 112 of the slot body of the terminal receiving slot 110 and the stopping plate 152, and a width W3 of the stopping plate 152 is smaller than a width W1 of the third section 254. The protruding rib 151 is located between the first support arms 255, and the first support arms 255 are position-limited to the second inner surface 112 of the slot body of the terminal receiving slot 110 by the guide frame 150. For example, two accommodation areas 153 are respectively defined by the stopping plate 152, the protruding rib 151 and the second inner surface 112 of the slot body. Therefore, when the conductive terminal 201 is inserted into the terminal receiving slot 110 of the base 100, and the stopping plate 152 of the guide frame 150 passes through the third section 254, and the protruding rib 151 moves into the second section 253 from the third section 254, so that these first support arms 255 are respectively position limited to the corresponding accommodation areas 153. Therefore, it is helpful to realize that the abutment portion 241A of the reversed folded portion 241 is in surface contact with the second inner surface 112 of the slot body of the terminal receiving slot 110. In addition, the foot connecting portion 270 is approximately Z-shaped rather than L-shaped. The distal end of the ball soldering member 271 is formed with a recessed portion 272. However, the present disclosure is not limited thereto.

Figure 11:
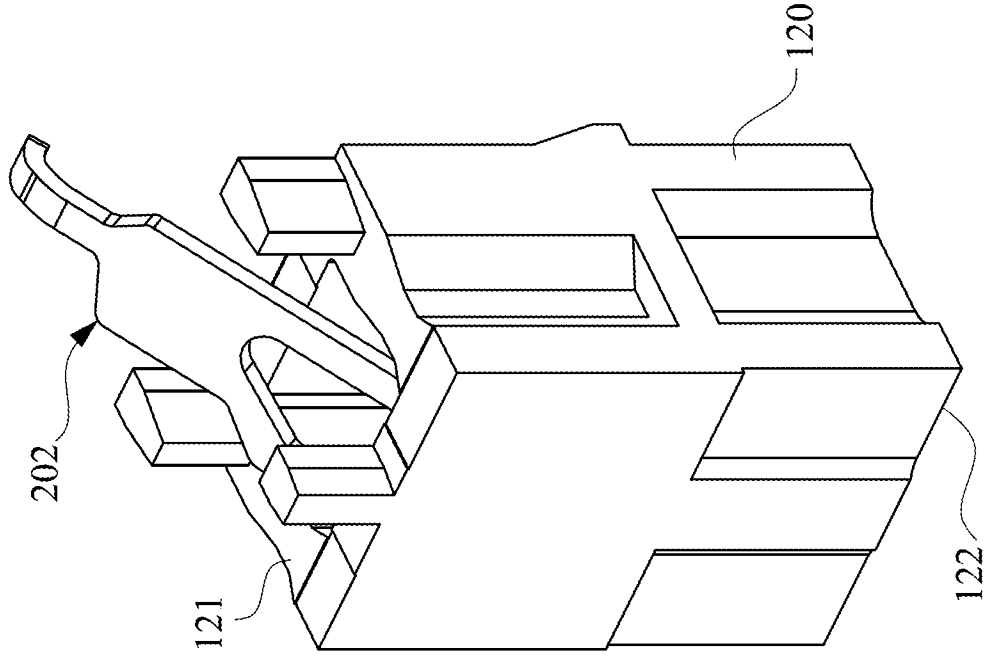
FIG. 11 is a perspective view of a connector device according to one embodiment of the present disclosure.
Figure 12:
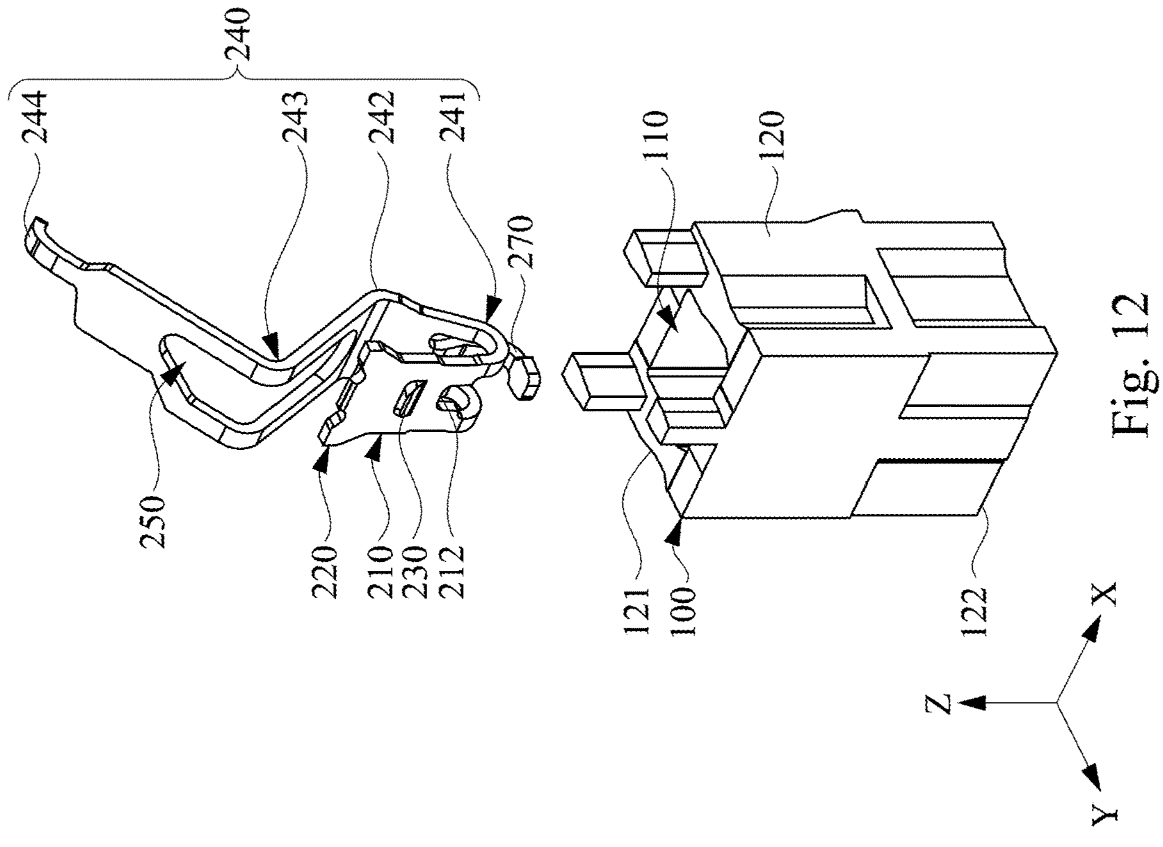
FIG. 12 is a disassembly view of the connector device of FIG. 11.
Figure 13:
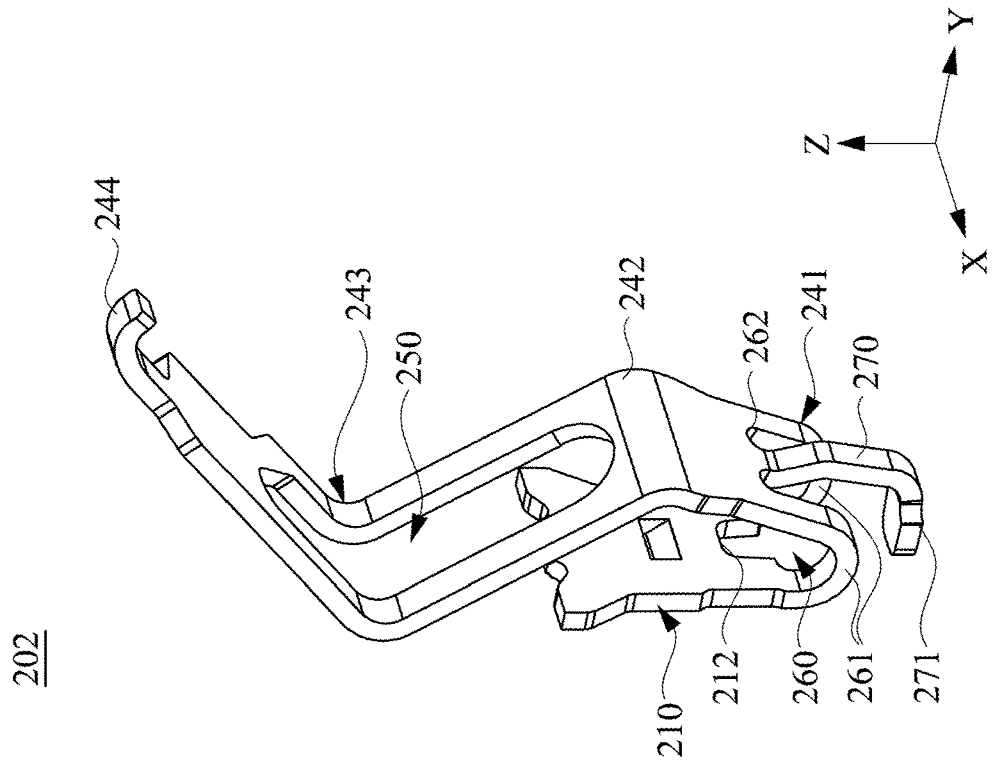
FIG. 13 is a perspective view of a conductive terminal viewed from another aspect in FIG. 12.

FIG. 11 is a perspective view of a connector device 12 according to one embodiment of the present disclosure. FIG. 12 is a disassembly view of the connector device 12 of FIG. 11. FIG. 13 is a perspective view of a conductive terminal 202 viewed from another aspect in FIG. 12. As shown in FIG. 11 to FIG. 13, in the embodiment, the connector device 12 of the embodiment and the connector device 10 of the embodiment are the substantially the same, however the differences therebetween are listed below. The foot connecting portion 270 is connected to the reversed folded portion 241. More patricianly, the elastic arm portion 240 further includes a curved hole 260 only formed at a lower part (that is, the part below the abutment portion 242) of the reversed folded portion 241 rather than the bending portion 243. The ball soldering member 271 of the foot connecting portion 270 is overlapped with the curved hole 260 in the vertical direction (e.g., Z-axis). The foot connecting portion 270 protrudes downwardly from the inner surface 262 of the curved hole 260 to extend out of the curved hole 260 and the terminal receiving slot 110. For example, the curved hole 260 divides the reversed folded portion 241 into two second support arms 261, and the foot connecting portion 270 located between the second support arms 261 extends downwardly from the lower surface 212 of the main body 210 (i.e., the inner surface 262 of the curved hole 260) to extend out of the curved hole 260 and the terminal receiving slot 110.

Figure 14A:
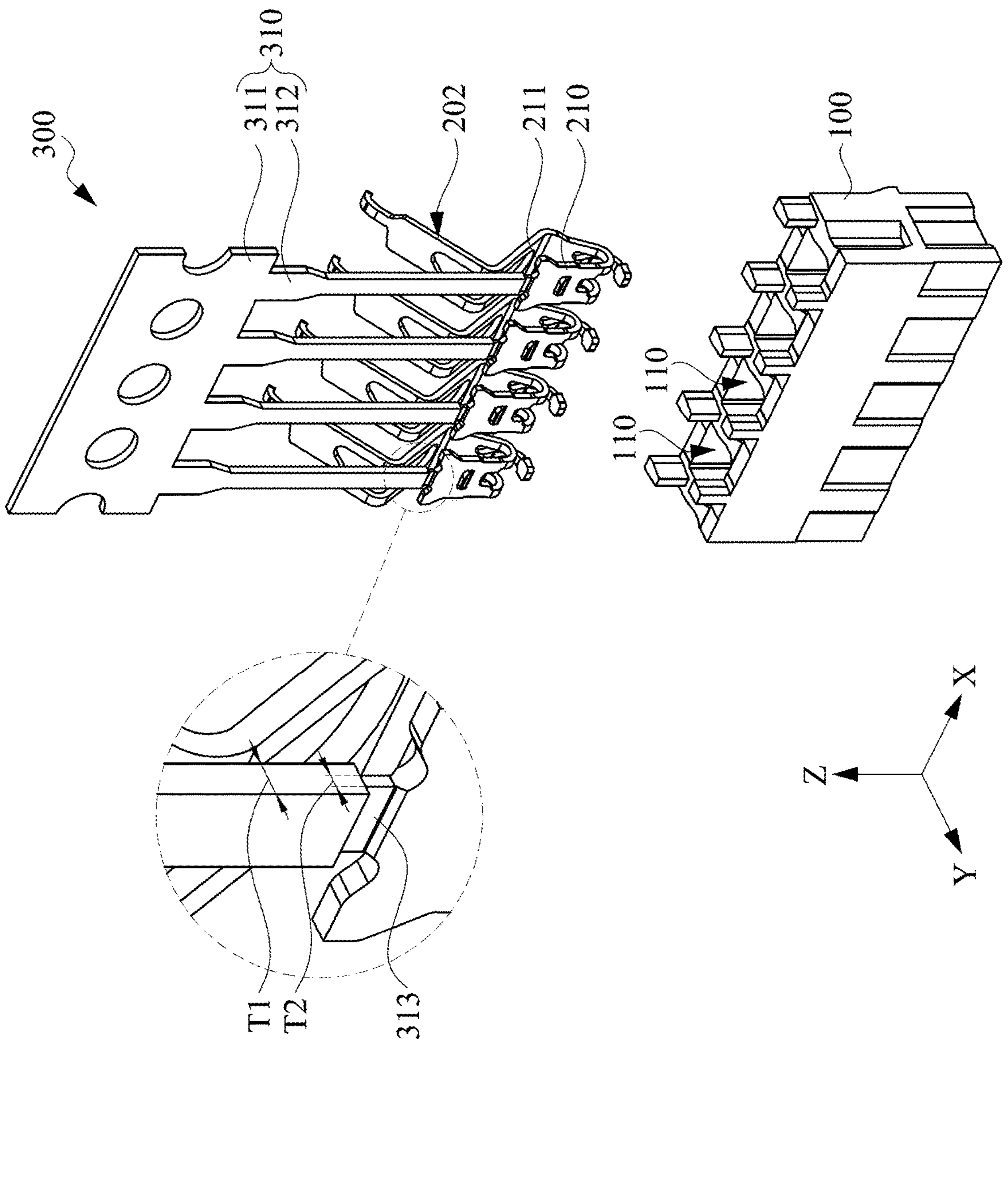
FIG. 14A to FIG. 14C are operational schematic views for separating conductive terminals of a terminal strip structure from a material strip in one embodiment of the present disclosure.
Figure 14B:
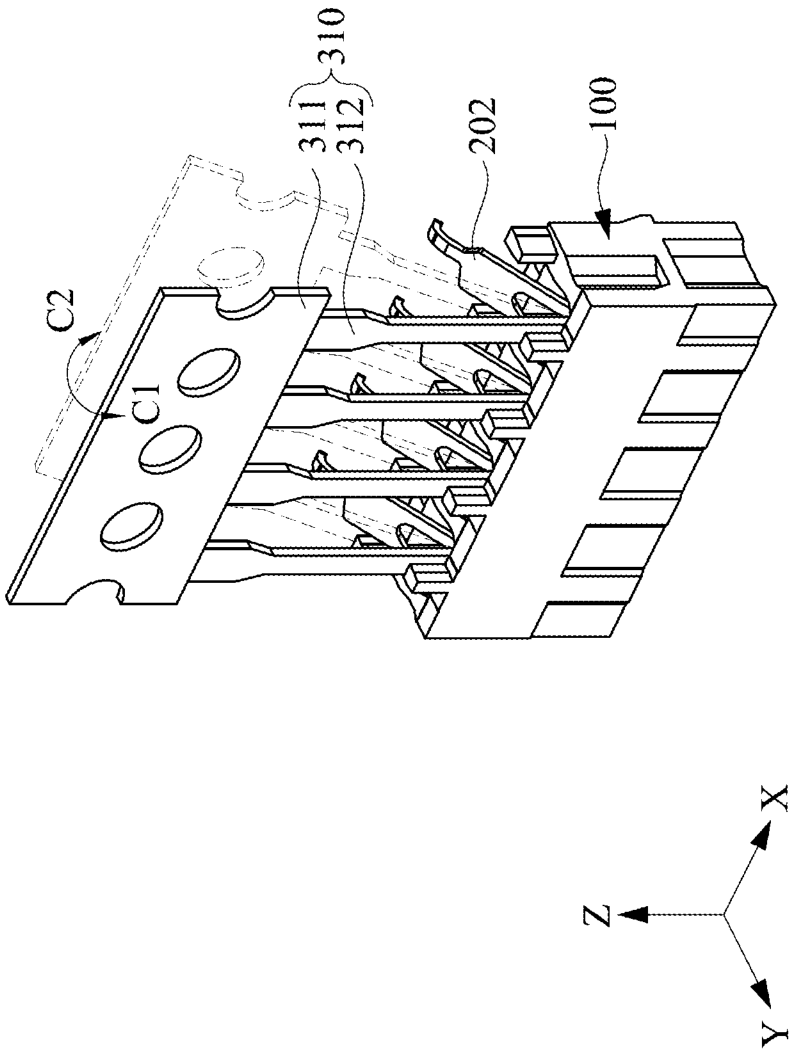
Figure 14C:
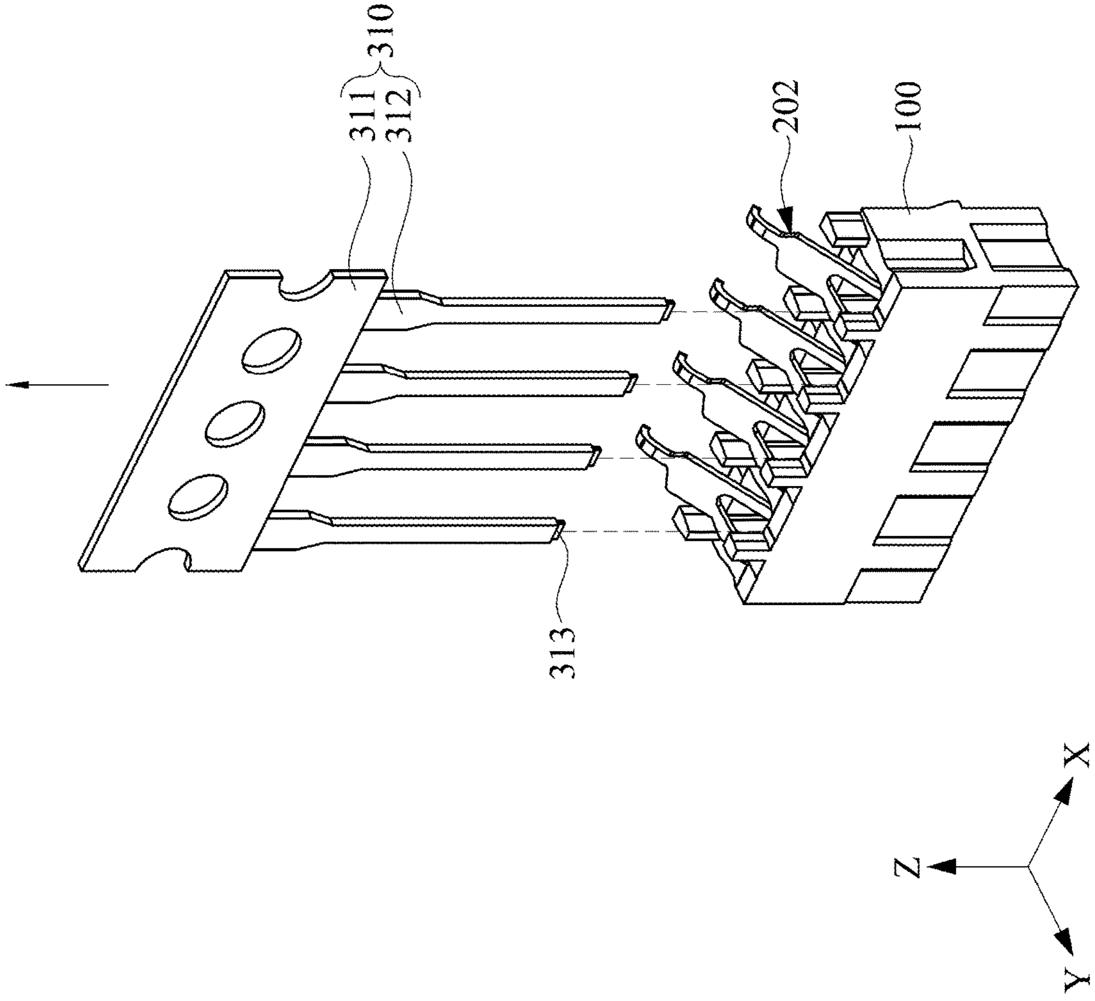

FIG. 14A to FIG. 14C are operational schematic views for separating conductive terminals 202 of a terminal strip structure 300 from a material strip 310 in one embodiment of the present disclosure. The terminal strip structure 300 of this embodiment can be used in the connector devices 10-12 of all the above embodiments, as shown in FIG. 14A. The terminal strip structure 300 includes a material strip 310 and a plurality of conductive terminals 202 which are formed integrally. The material strip 310 includes a plate portion 311 and a plurality of extension portions 312. The plate portion 311 and the extension portions 312 are coplanar with each other. The extension portions 312 which are parallel to each other are connected to the same lateral side of the plate portion 311 at intervals. One end of each of the extension portions 312 facing away from the plate portion 311 is provided with a neck portion 313. The neck portion 313 is connected to the upper surface 211 of the main body 210, and a thickness T2 of the neck portion 313 is smaller than a thickness T1 of one of the extension portions 312. One end of each of the extension portions 312 is connected to one side of the plate portion 311, and the other end thereof is connected to the upper surface 211 of the main body 210 of one of the conductive terminals 202 through its neck portion 313.

As shown in FIG. 14A and FIG. 14B, when an assembler respectively inserts the conductive terminals 202 of the terminal strip structure 300 into the plurality of terminal receiving slots 110 formed on the base 100, the main body 210 of each of the conductive terminals 202 is fixed within one of the terminal receiving slots 110 in the above manner; then, as shown in FIG. 14A and FIG. 14C, the assembler repeatedly swings the material strip 310 (i.e., swing directions C1 and C2) a certain number of times about the X axis. Eventually, these neck portions 313 break from the upper surface 211 of the main body 210 due to metal fatigue. Thus, the steps of completely separating the material strip 310 from the conductive terminal 202 and moving upward away from the base 100 are completed. In this way, there is no need to perform the detachment process of these conductive terminals 202 without using any machine or tool.

It is noted, since the elastic arm portion 240 of the conductive terminals 202 is formed with an elongated hole 250, when the assembler repeatedly swings the material strip 310, the extension portions 312 of the material strip 310 can move into the elongated hole 250, thereby increasing the amplitude of repeated swings by the assembler so as to speed up the operation time.

Thus, through the construction of the embodiments above, the conductive terminal of the disclosure can be assembled into the terminal receiving slot of the base without hard interference, thereby reducing the possibility of the conductive terminal being uncontrollable warped in the base so as to lower the overall conductive performance of the connector device.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A conductive terminal formed by bending an elastic metal sheet and suitable for being installed in a terminal receiving slot of a base, comprising:

a main body comprising at least one holding portion and a buckle portion, and the at least one holding portion and the buckle portion which are respectively used for fixing the main body within the terminal receiving slot;

an elastic arm portion comprising a reversed folded portion, an abutment portion, a bending portion and a conductive portion, the reversed folded portion extending downward from a lower surface of the main body and extending upward after being folded, the abutment portion located between the reversed folded portion and the bending portion, and arranged opposite to the main body, the bending portion connected to the abutment portion and the conductive portion, respectively; and a foot connecting portion connected to one of the main body and the reversed folded portion, and further provided with a ball soldering member extending outwardly from the foot connecting portion for connecting to soldering balls.

2. The conductive terminal of claim 1, wherein the at least one holding portion further comprises:

two holding portions respectively located on two opposite sides of the main body for position-limiting the main body within the terminal receiving slot.

3. The conductive terminal of claim 1, wherein the buckle portion is protruded from one surface of the main body facing away from the elastic arm portion for fixing the main body within the terminal receiving slot.

4. The conductive terminal of claim 1, wherein an upper surface of the main body is formed with a concave portion, and an inner bottom surface of the concave portion is implemented as the buckle portion for fixing the main body in the terminal receiving slot.

5. The conductive terminal of claim 1, wherein the foot connecting portion and the reversed folded portion both extend from the lower surface of the main body.

6. The conductive terminal of claim 1, wherein the elastic arm portion is further formed with an elongated hole having a closed outline, and the elongated hole is formed longitudinally on the bending portion to divide into two support arms.

7. The conductive terminal of claim 1, wherein the elastic arm portion further comprises a curved hole formed on the reversed folded portion, and the foot connecting portion is connected to the reversed folded portion and an inner surface of the curved hole.

8. A connector device, comprising:

a base formed with a plurality of terminal receiving slots, each of the terminal receiving slots comprising a slot body, an engaging portion and a limiting slot, and the engaging portion and the limiting slot that are commonly disposed on one inner surface of the slot body; and a plurality of conductive terminals, each of the conductive terminals comprising:

a main body disposed within the slot body and comprising at least one holding portion limiting the main body within the limiting slot, and a buckle portion engaged with the engaging portion;

an elastic arm portion comprising a reversed folded portion, an abutment portion, a bending portion and a conductive portion, the reversed folded portion extending downward from a lower surface of the main body and extending upward after being folded, the abutment portion located between the reversed folded portion and the bending portion, arranged opposite to the main body, and physically contacted with another inner surface of the slot body, the bending portion protruding obliquely from the terminal receiving slot and connected to the abutment portion and the conductive portion, respectively; and a foot connecting portion protruding downwardly from one of the main body and the reversed folded portion to extend out of the terminal receiving slot, and further provided with a ball soldering member extending outwardly from the foot connecting portion for connecting to soldering balls.

9. The connector device of claim 8, wherein the limiting slot is funnel-shaped, and the at least one holding portion further comprises two holding portions respectively located on two opposite sides of the main body, wherein when the main body moves downwardly into the limiting slot, the main body is position-limited within the limiting slot by two opposite inner surfaces of the limiting slot abutting against the holding portions, respectively.

10. The connector device of claim 8, wherein the buckle portion is protruded from one surface of the main body facing away from the elastic arm portion, the engaging portion is protruded within the limiting slot and located on a middle of one of the terminal receiving slots, wherein when the main body is position-limited within the limiting slot, the main body is fixed within the limiting slot through the engaging portion and the buckle portion engaged with each other.

11. The connector device of claim 8, wherein an upper surface of the main body is formed with a concave portion, and an inner bottom surface of the concave portion is implemented as the buckle portion, and the engaging portion is protruded from the inner surface of the slot body and located on a middle of the inner surface of the slot body, wherein when the main body is position-limited within the limiting slot, the main body is fixed within the limiting slot through the inner bottom surface of the concave portion and the buckle portion engaged with each other.

12. The connector device of claim 8, wherein the foot connecting portion and the reversed folded portion both extend from the lower surface of the main body.

13. The connector device of claim 8, wherein the elastic arm portion is further formed with an elongated hole having a closed outline, and the elongated hole is formed longitudinally on the bending portion to divide into two support arms.

14. The connector device of claim 8, wherein the elastic arm portion further comprises a curved hole formed on the reversed folded portion, and the foot connecting portion is connected to the reversed folded portion and an inner surface of the curved hole.

15. A terminal strip structure, comprising:

a material strip comprising a plate portion and a plurality of extension portions, the plate portion and the extension portions that are coplanar with each other, the extension portions arranged on a lateral side of the plate portion at intervals, and each of the extension portions protruding outwards from the plate portion, one end of each of the extension portions facing away from the plate portion is provided with a neck portion, and a thickness of the neck portion is smaller than a thickness of one of the extension portions; and a plurality of conductive terminals, each of the conductive terminals comprising a main body, an elastic arm portion and a foot connecting portion, an upper surface of the main body that is connected to the neck portion, and the main body comprising at least one holding portion and a buckle portion, and the elastic arm portion comprising a reversed folded portion, an abutment portion, a bending portion and a conductive portion, the reversed folded portion extending downward from a lower surface of the main body and extending upward after being folded, the abutment portion located between the reversed folded portion and the bending portion, and arranged opposite to the main body, the bending portion connected to the abutment portion and the conductive portion, respectively, and the foot connecting portion connected to one of the main body and the reversed folded portion, and the foot connecting portion further provided with a ball soldering member extending outwardly, wherein after the conductive terminals of the terminal strip structure respectively are inserted into a plurality of terminal receiving slots of a base, the material strip is completely separated from the conductive terminals by repeatedly swinging the material strip frontwards and backwards to break the neck portions.

16. The terminal strip structure of claim 15, wherein the at least one holding portion further comprises:

two holding portions respectively located on two opposite sides of the main body for position-limiting the main body within one of the terminal receiving slots.

17. The terminal strip structure of claim 15, wherein the buckle portion is protruded from one surface of the main body facing away from the elastic arm portion for fixing the main body within one of the terminal receiving slots.

18. The terminal strip structure of claim 15, wherein an upper surface of the main body is formed with a concave portion, and an inner bottom surface of the concave portion is implemented as the buckle portion for fixing the main body within one of the terminal receiving slots.

19. The terminal strip structure of claim 15, wherein the foot connecting portion and the reversed folded portion both extend from the lower surface of the main body.

20. The terminal strip structure of claim 15, wherein the elastic arm portion is further formed with an elongated hole having a closed outline, and the elongated hole is formed longitudinally on the bending portion to divide into two support arms.

* * * * *